United States Patent
Michael et al.

(10) Patent No.: US 9,135,083 B2
(45) Date of Patent: *Sep. 15, 2015

(54) METHODS FOR SINGLE-OWNER MULTI-CONSUMER WORK QUEUES FOR REPEATABLE TASKS

(75) Inventors: Maged M. Michael, Danbury, CT (US); Vijay Anand Saraswat, Mahopac, NY (US); Martin Vechev, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 631 days.

This patent is subject to a terminal disclaimer.

(21) Appl. No.: 13/452,286

(22) Filed: Apr. 20, 2012

(65) Prior Publication Data
US 2012/0210322 A1 Aug. 16, 2012

Related U.S. Application Data

(63) Continuation of application No. 12/172,577, filed on Jul. 14, 2008, now Pat. No. 8,266,394.

(51) Int. Cl.
*G06F 9/52* (2006.01)
(52) U.S. Cl.
CPC .......... *G06F 9/526* (2013.01); *G06F 2209/521* (2013.01)
(58) Field of Classification Search
CPC combination set(s) only.
See application file for complete search history.

(56) References Cited

U.S. PATENT DOCUMENTS

| | | | |
|---|---|---|---|
| 5,305,448 A * | 4/1994 | Insalaco et al. | 711/164 |
| 6,687,247 B1 * | 2/2004 | Wilford et al. | 370/392 |
| 6,934,741 B2 * | 8/2005 | Shavit et al. | 709/214 |
| 7,143,410 B1 * | 11/2006 | Coffman et al. | 718/100 |
| 7,234,139 B1 * | 6/2007 | Feinberg | 718/1 |
| 7,299,242 B2 * | 11/2007 | Moir et al. | 1/1 |
| 8,279,885 B2 * | 10/2012 | Riddle | 370/412 |
| 2005/0065986 A1 * | 3/2005 | Bixby et al. | 707/204 |
| 2005/0132374 A1 * | 6/2005 | Flood et al. | 718/100 |
| 2007/0067774 A1 * | 3/2007 | Kukanov et al. | 718/102 |
| 2007/0121499 A1 * | 5/2007 | Pal et al. | 370/230 |
| 2007/0169123 A1 * | 7/2007 | Hopkins | 718/100 |

OTHER PUBLICATIONS

Chase et al., Dynamic Circular Work-Stealing Deque; SPAA '05 Jul. 18-20, 2005; Las Vegas, NV; pp. 21-28.
Hendler et al., Non-Blocking Steal-Half Work Options; PODC 2002; Jul. 21-24, 2002; Monterey, CA; pp. 280-289.

(Continued)

*Primary Examiner* — Eric Coleman
(74) *Attorney, Agent, or Firm* — Tutunjian & Bitetto, P.C.; Jennifer R. Davis

(57) ABSTRACT

There are provided methods for single-owner multi-consumer work queues for repeatable tasks. A method includes permitting a single owner thread of a single owner, multi-consumer, work queue to access the work queue using atomic instructions limited to only a single access and using non-atomic operations. The method further includes restricting the single owner thread from accessing the work queue using atomic instructions involving more than one access. The method also includes synchronizing amongst other threads with respect to their respective accesses to the work queue.

20 Claims, 14 Drawing Sheets

(56) References Cited

OTHER PUBLICATIONS

Arora et al., Thread Scheduling for Multiprogrammed Multiprocessors; SPAA '98; Puerto Vallarta, Mexico; 1998; pp. 119-129.

Maged M. Michael; Hazard Pointers: Safe Memory Reclamation for Lock-Free Objects; IEEE Transactions on Parallel and Distributed Systems; vol. 15, No. 6; Jun. 2004; pp. 491-504.

* cited by examiner

METHODS FOR SINGLE-OWNER MULTI-CONSUMER WORK QUEUES FOR REPEATABLE TASKS

CROSS-REFERENCE TO RELATED APPLICATIONS

This application is a continuation of U.S. application Ser. No. 12/172,577, filed on Jul. 14, 2008, which is incorporated by reference herein in its entirety.

GOVERNMENT RIGHTS

This invention was made with Government support under Contract No.: HR0011-07-9-0002. The Government has certain rights in this invention.

BACKGROUND

1. Technical Field

The present invention relates to information protection and queues and, more particularly, to methods for single-owner multi-consumer work queues for repeatable tasks.

2. Description of the Related Art

Single-owner multi-consumer work queues, also commonly referred to as work stealing queues, are typically used to hold the work created by a thread, while allowing other threads to steal work if their own work queues are empty. Since a work queue may be accessed concurrently by the queue's owner and other threads attempting to steal work, synchronization is needed. In particular, the thread's owner is required to use "special" atomic instructions (e.g., compare-and-swap instructions, also interchangeably referred to herein by the acronym "CAS"), which are typically significantly slower than regular instructions.

In general, each task in the work queue should be extracted exactly once from the queue (and hence performed exactly once, e.g., transfer money). However, in many other cases (e.g., perform a calculation), it is acceptable for tasks to be performed one or more times, i.e., when tasks are idempotent. For such latter class of tasks (i.e., those tasks to be performed one or more times), this should be an opportunity to design work stealing queues that guarantee correct concurrent access with less synchronization overheads than work stealing queues that guarantee that each task is extracted exactly once.

SUMMARY

The shortcomings of the prior art are overcome and additional advantages are provided through the provision of methods for lock-free work stealing queue for repeatable tasks.

According to an aspect of the present principles, there is provided a method. The method includes permitting a single owner thread of a single owner, multi-consumer, work queue to access the work queue using atomic instructions limited to only a single access and using non-atomic operations. The method further includes restricting the single owner thread from accessing the work queue using atomic instructions involving more than one access. The method also includes synchronizing amongst other threads with respect to their respective accesses to the work queue.

According to another aspect of the present principles, there is provided a program storage device readable by machine, tangibly embodying a program of instructions executable by the machine to perform method steps for queue access management. The method steps include permitting a single owner thread of a single owner, multi-consumer, work queue to access the work queue using atomic instructions limited to only a single access and using non-atomic operations. The method steps further include restricting the single owner thread from accessing the work queue using atomic instructions involving more than one access. The method steps also include synchronizing amongst other threads with respect to their respective accesses to the work queue.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

As noted above, the present principles are directed to methods for lock-free work stealing queue for repeatable tasks.

In an embodiment, the present principles permit the queue owner to perform its operations (insertion and extraction) from the queue without regard for concurrent stealing operations. Thus, in an embodiment, the operations of the queue owner do not use any complex or special atomic instructions (as explicitly defined herein). On the other hand, the stealing threads (thieves) synchronize among each other in order to maintain the integrity of the queue.

In an embodiment, in order to maintain the integrity of the queue even when the owner is not using atomic operations, the owner never writes shared variables written by thieves (other than for initialization) and thieves never write shared variables written by the owner.

Figure 1:
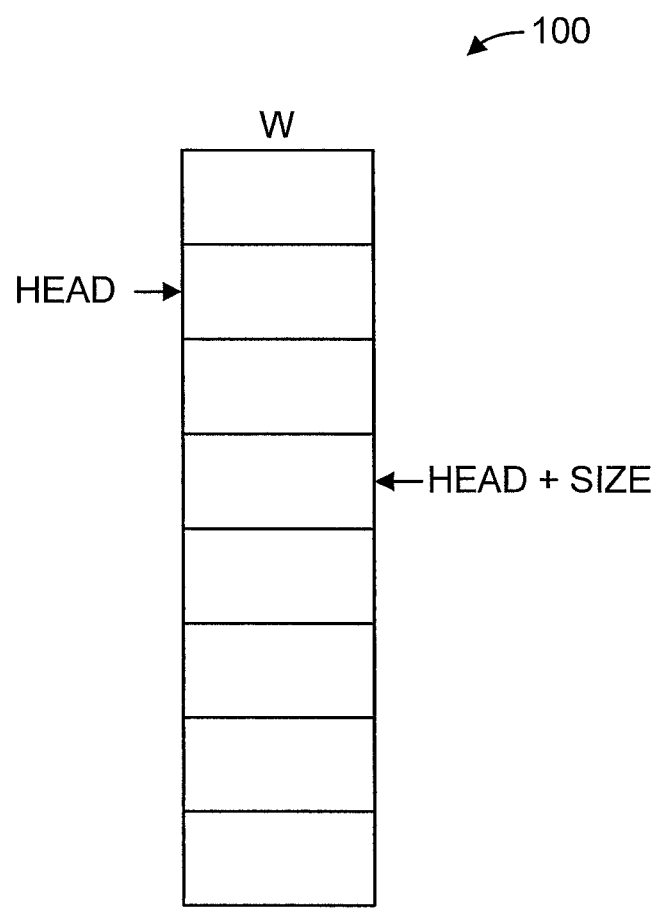
FIG. 1 shows an exemplary work queue 100 with two tasks, to which the present principles may be applied, in accordance with an embodiment of the present principles.

FIG. 1 shows an exemplary work queue 100 with two tasks, to which the present principles may be applied, in accordance with an embodiment of the present principles.

The reference character W represents a circular array of work items of size M. With respect to array W, the queue owner puts work items into the array, and the owner and other threads may take work items from the array. During normal queue operations (put, take, and steal), the size of the array is treated as constant. However, the owner of the queue can resize the array in a straightforward manner as described herein.

The reference character H denotes a single variable that can be accessed atomically. H includes three integer components corresponding to the head of the work queue 100, the size of the work queue 100, and tag for the work queue 100, respectively. The head of the work queue corresponds to the index of the head of the work queue, i.e., the next item to be extracted from the queue by threads other than the queue owner's thread. The size of the work queue corresponds to the number of items in the work queue 100. The tag for the work queue is a number that is incremented on every extraction. Preferably, the size of the tag is large enough (e.g., 40 bits) such that it is impossible for the tag to make a complete wrap-around during a single operation on the queue by a thread. The initial value of H is all zeros.

Figure 2A:
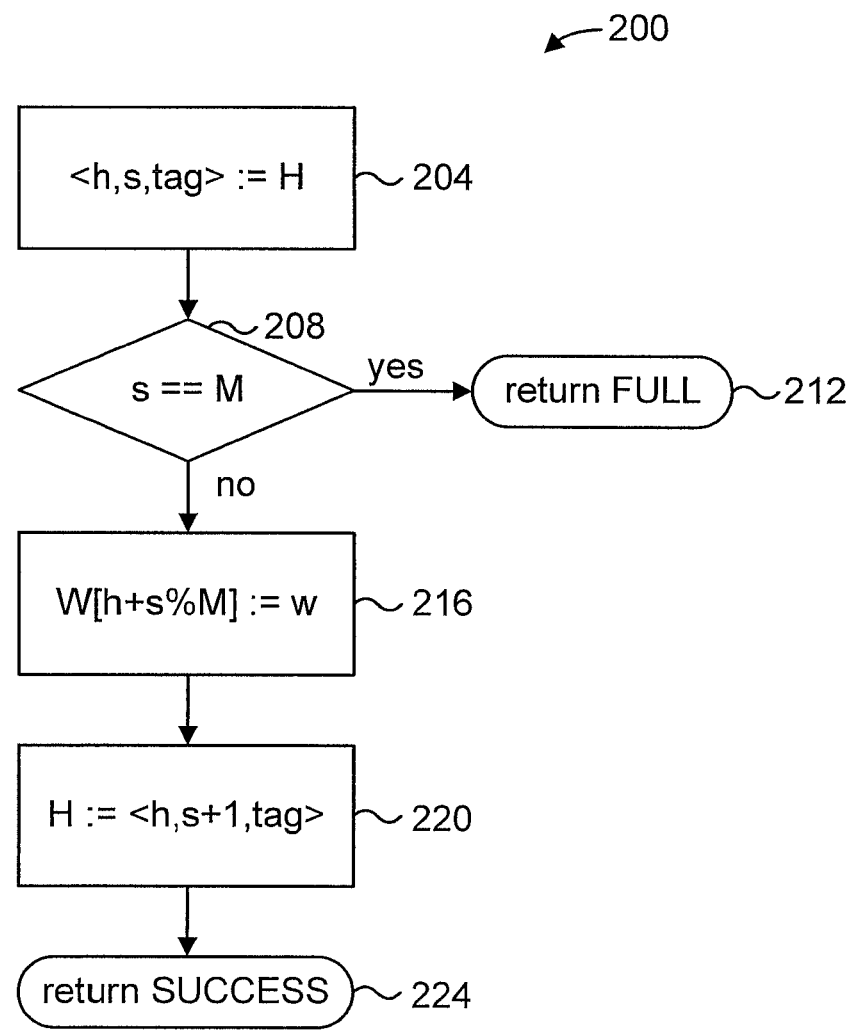
FIGS. 2A, 2B, and 2C respectively show exemplary methods 200, 230, and 260 relating to double-ended extraction on a work queue, in accordance with an embodiment of the present principles.
Figure 2B:
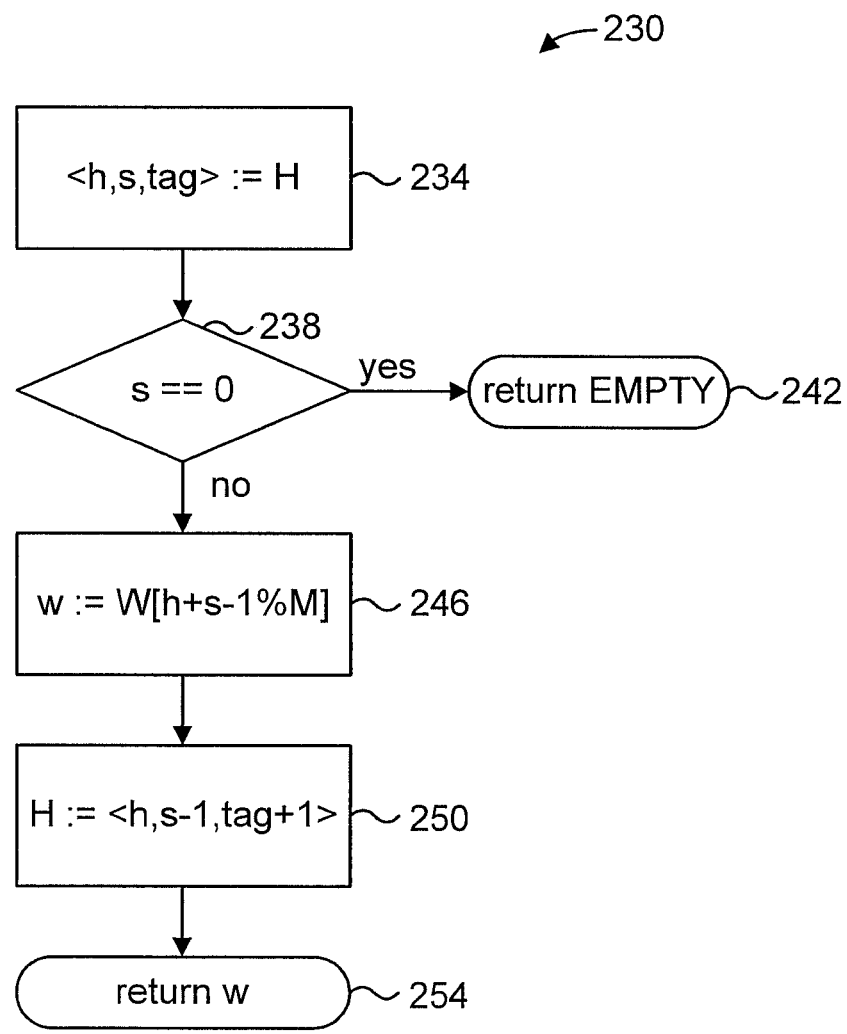
Figure 2C:
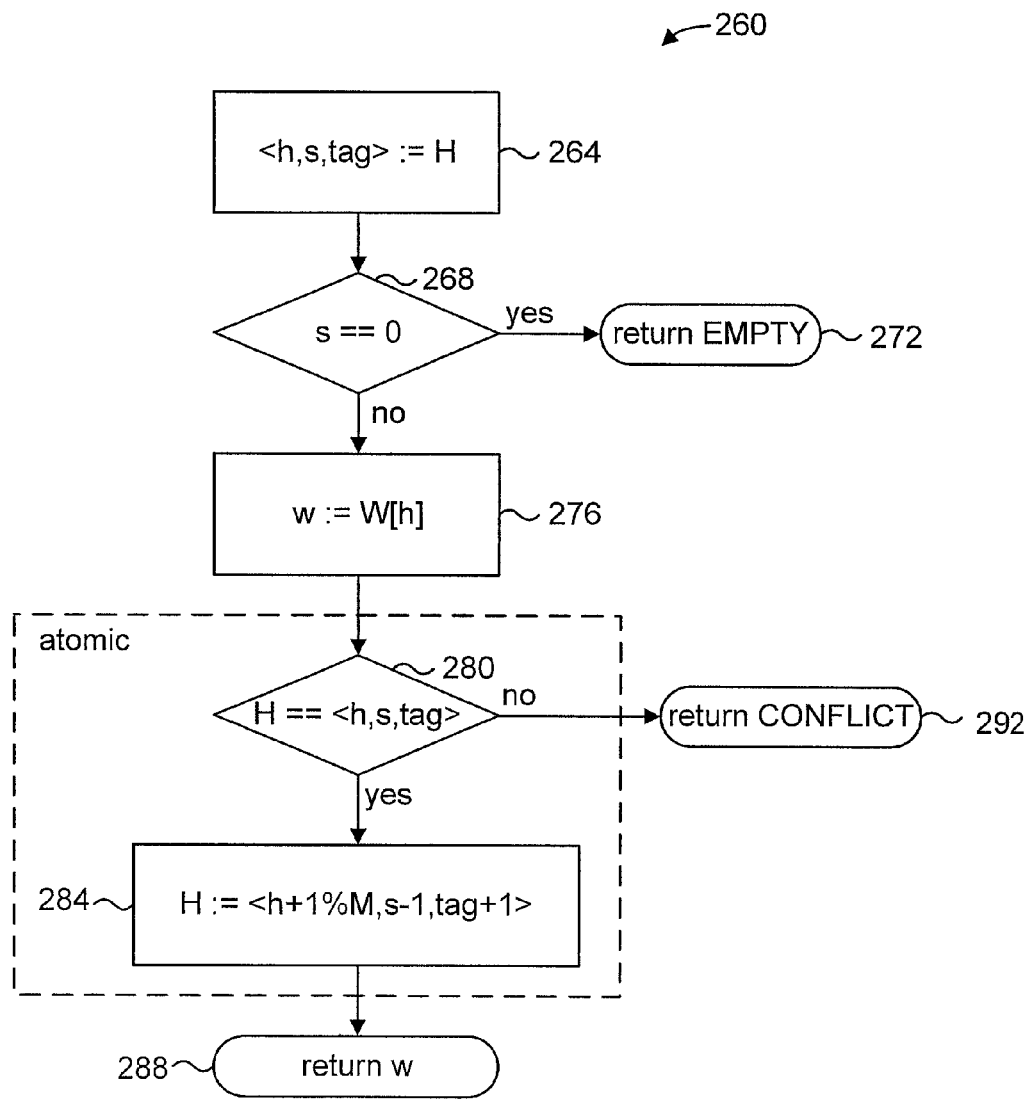

FIGS. 2A, 2B, and 2C respectively show exemplary methods 200, 230, and 260 relating to double-ended extraction on a work queue, in accordance with an embodiment of the present principles. In further detail, the method 200 of FIG. 2A corresponds to a Put(w) operation, the method 230 of FIG. 2B corresponds to a Take( ) operation, and the method 260 of FIG. 2C corresponds to a Steal( ) operation, each corresponding to double-ended extraction on a work queue. The methods 200, 230, and 260 may be applied, for example, to the work queue 100 of FIG. 1.

Initially, the Put(w) operation will be generally described, following by a description of the method 200 of FIG. 2A. Only the owner thread (i.e., owner) of the queue can perform a Put(w) operation on the queue. The owner puts a new work item at the tail end of the work queue. The Put(w) operation takes as a parameter the work item to be added to the queue.

Referring to method 200 of FIG. 2A, at step 204, three integer values (corresponding to head, size, and tag, respectively) are atomically read from a variable H into local variables h, s, and tag, respectively. At step 208, it is then determined whether or not the value of s is equal to the capacity of the queue (i.e., the size M of the array W).

If so (i.e., the value of S is equal to M), then at step 212, an indicator is provided that the queue is full. In such a case, the owner of the queue may be permitted to decide the next course of action including, but not limited to, extending the size of the array W.

If the value of S is not equal to M (i.e., it is smaller than M), then at step 216, the queue owner writes the item w into the entry of array W with index h+s % M. This write operation does not have to be atomic.

At step 220, the queue owner atomically writes to the variable H the three values h, s+1, tag. That is, the head index is unchanged, but the size of the queue has increased by one.

At step 224, the Put(w) operation returns a success indicator.

With respect to the Take( ) operation, initially, the Take( ) operation will be generally described, following by a description of the method 230 of FIG. 2B. Only the owner thread (i.e., owner) of the queue can perform a Take( ) operation on the queue. The Take( ) operation returns a work item that was put earlier by the owner thread, or an indictor of an empty queue if the queue is empty. The Take( ) operation extracts a work item from the tail end of the queue, i.e., the most recent item put in the queue by the owner.

Referring to FIG. 2B, at step 234, three integer values (head, size, tag) are atomically read from variable H into local variables h, s, and tag, respectively. At step 238 it is determined whether or not s is equal to zero.

If so (i.e., the value of S is equal to zero), then at step 242, an indicator is provided that the queue is empty.

If the value of S is not equal to zero (i.e., it is greater than zero), then at step 246, the queue owner reads the entry of array W with index h+s−1% M (i.e., the most recently added item). This read operation does not have to be atomic.

At step 250, the owner writes atomically to the variable H the three values h s−1, and tag+1. That is, the head index is unchanged, but the size of the queue has decreased by one, and the extraction tag is incremented.

At step 254, the Take( ) operation returns the extracted item.

With respect to the Steal( ) operation, initially, the Steal( ) operation will be generally described, following by a description of the method 260 of FIG. 2C. A Steal( ) operation is executed by a thread different (hereinafter referred to as "other thread" or "other thread(s)") from the thread owner. Typically, the other thread has an empty work queue, and hence is looking to help other threads with their work. The Steal( ) operation returns a work item that was put in the queue by the queue's owner, an indicator of an empty queue if the queue is empty, or an indicator of conflict. The Steal( ) operation extracts a work item from the head of the queue, i.e., the oldest item in the queue.

Referring to FIG. 2C, at step 264, three integer values (corresponding to head, size, tag) are atomically read from a variable H into local variables h, s, and tag, respectively. At step 268, it is determined whether or not s is equal to zero.

If so (i.e., the value of S is equal to zero), then at step 272, an indicator is provided that the queue is empty.

If the value of S is not equal to zero (i.e., it is greater than zero), then at step 276, the other thread reads the entry of array W with index h, i.e., at the head of the queue. This read need not be atomic.

At step 280, the other thread atomically checks that the value of H is the same as that read in the first step (i.e., step 264).

If not (i.e., the value of H is different), then at step 292, an indicator is provided that a conflict exists. In such a case, the other thread may be permitted to decide on the next course of action including, but not limited to, for example, retrying the operation on this work queue or trying a different work queue.

If the value of H is the same (between steps 264 and 280), then at step 284, the other thread writes to H the three values h+1% M, s−1, tag+1. The read-check-write are all done atomically using complex atomic instructions such as, but not limited to, for example, compare-and-swap.

At step 288, the Steal( ) operation returns the extracted item.

In an embodiment, the methods 200, 230, and 260 of FIGS. 2A, 2B, and 2C, respectively, may be represented by the following pseudo code. In the following pseudo code, the operations Put(w) and Take( ) are performed by the owner only.

Structures
H: <integer,integer,integer>//<Head,Size,Tag>
W: array of tasks of size M
Initialization
H:=<0, 0, 0>
Put (w)
1 <h, s, tag>:=H
if (s==M) return FULL
2 W [h+s % M]:=w
3 H:=<h, s+1, tag>
return SUCCESS

```
Take( )
1 <h, s, tag>:=H
  if (s==0) return EMPTY
2 w:=[h+s−1% M]
3 H:=<h, s−1, tag+1>
  return w
Steal( )
1 <h, s, tag>:=H
  if (s==0) return EMPTY
2 w:=[h % M]
3 if !CAS (H, <h, s, tag>, <h+1% M, s−1, tag+1>) return CONFLICT
  return w
```

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As used herein, the word "owner" and the phrases "thread owner", "owner thread", and variations thereof, each interchangeably refer to a thread that currently has ownership (e.g., a lock) on a particular queue. The particular queue may be referred to as the "owned queue" and variations thereof.

Moreover, as used herein, the phrase "atomic operation" refers to a set of operations that can be combined so that they appear to be (to a corresponding system in which they are used) single operation. Examples of atomic instructions include a read only, a write only, and so forth, where each of these instructions involves only one access.

Further, as used herein, the phrases "complex atomic instruction" and "special atomic instruction" interchangeably refer to atomic instructions that necessarily involve more than one access. Examples of complex atomic instructions include a read-modify-write, a read-check-write, and so forth. The read and the write are accesses to shared memory, while the check and modify are applied privately to the read value.

Figure 3:
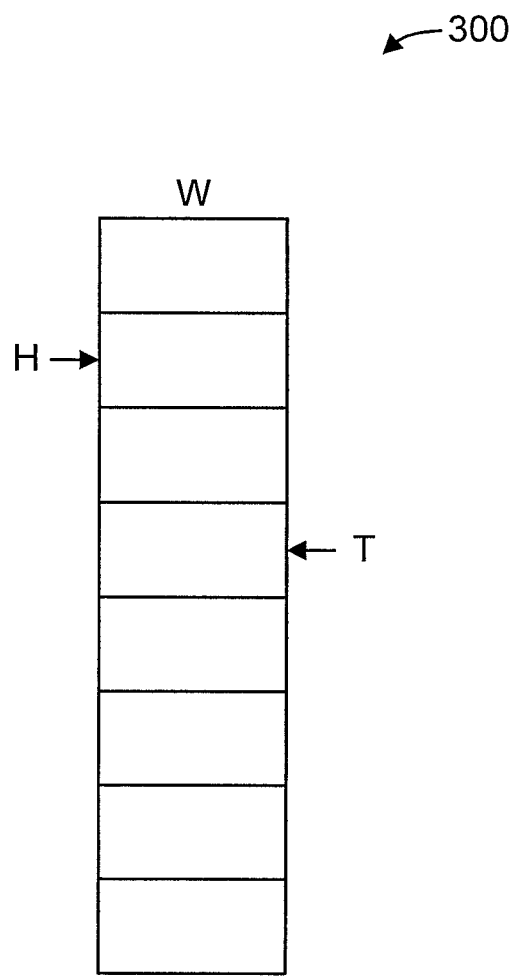
FIG. 3 shows an exemplary work queue 300 with two tasks, to which the present principles may be applied, in accordance with an embodiment of the present principles.

FIG. 3 shows an exemplary work queue 300 with two tasks, to which the present principles may be applied, in accordance with an embodiment of the present principles.

The reference character W represents a circular array of work items of size M. With respect to array W, the queue owner puts work items into the array, and the owner and other threads may take work items from the array. During normal queue operations (put, take, and steal), the size of the array is treated as constant. However, the owner of the queue can resize the array in a straightforward manner as described herein.

The reference character H denotes a single integer variable indicating the head of the queue. The initial value of H is zero.

The reference character T denotes a single integer variable indicating the tail of the queue. The initial value of T is zero.

Figure 4A:
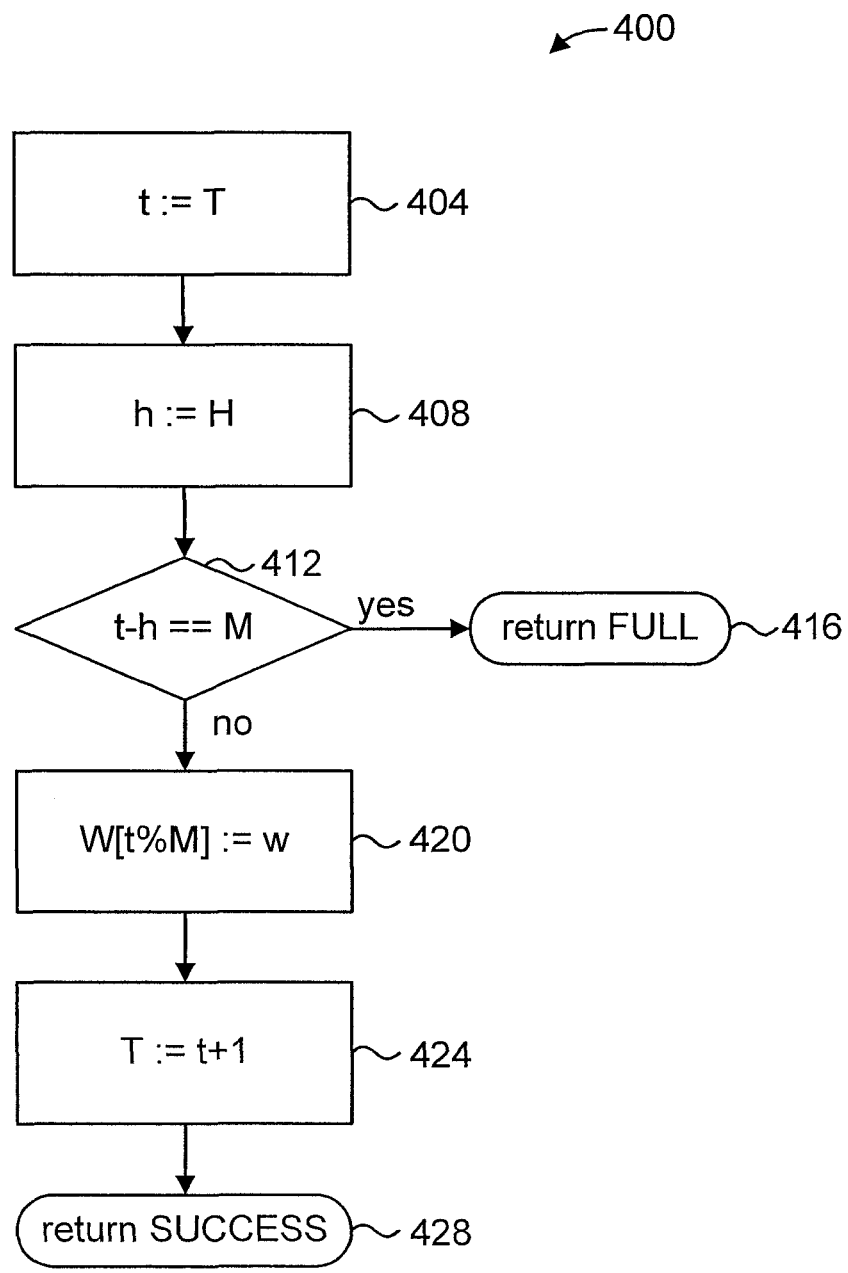
FIGS. 4A, 4B, and 4C respectively show exemplary methods 400, 430, and 460 relating to double-ended extraction on a work queue, in accordance with an embodiment of the present principles.
Figure 4B:
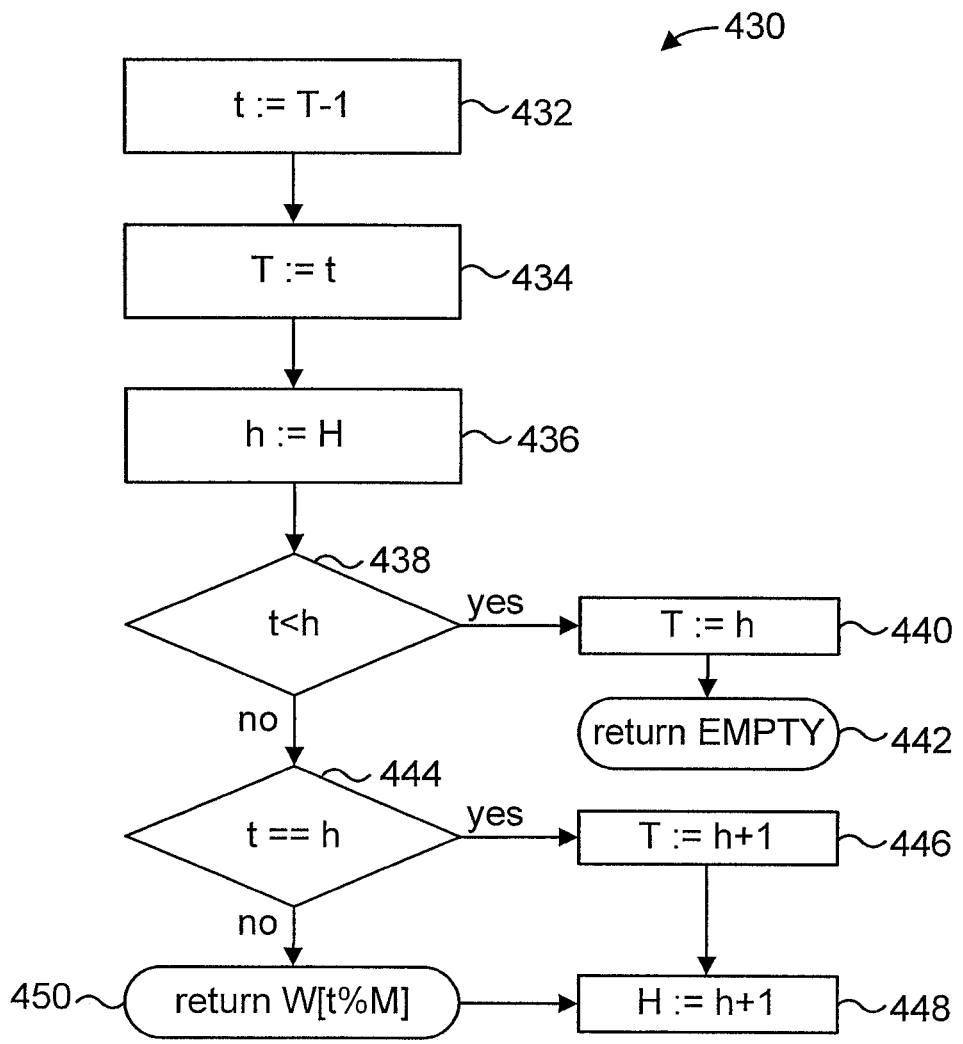
Figure 4C:
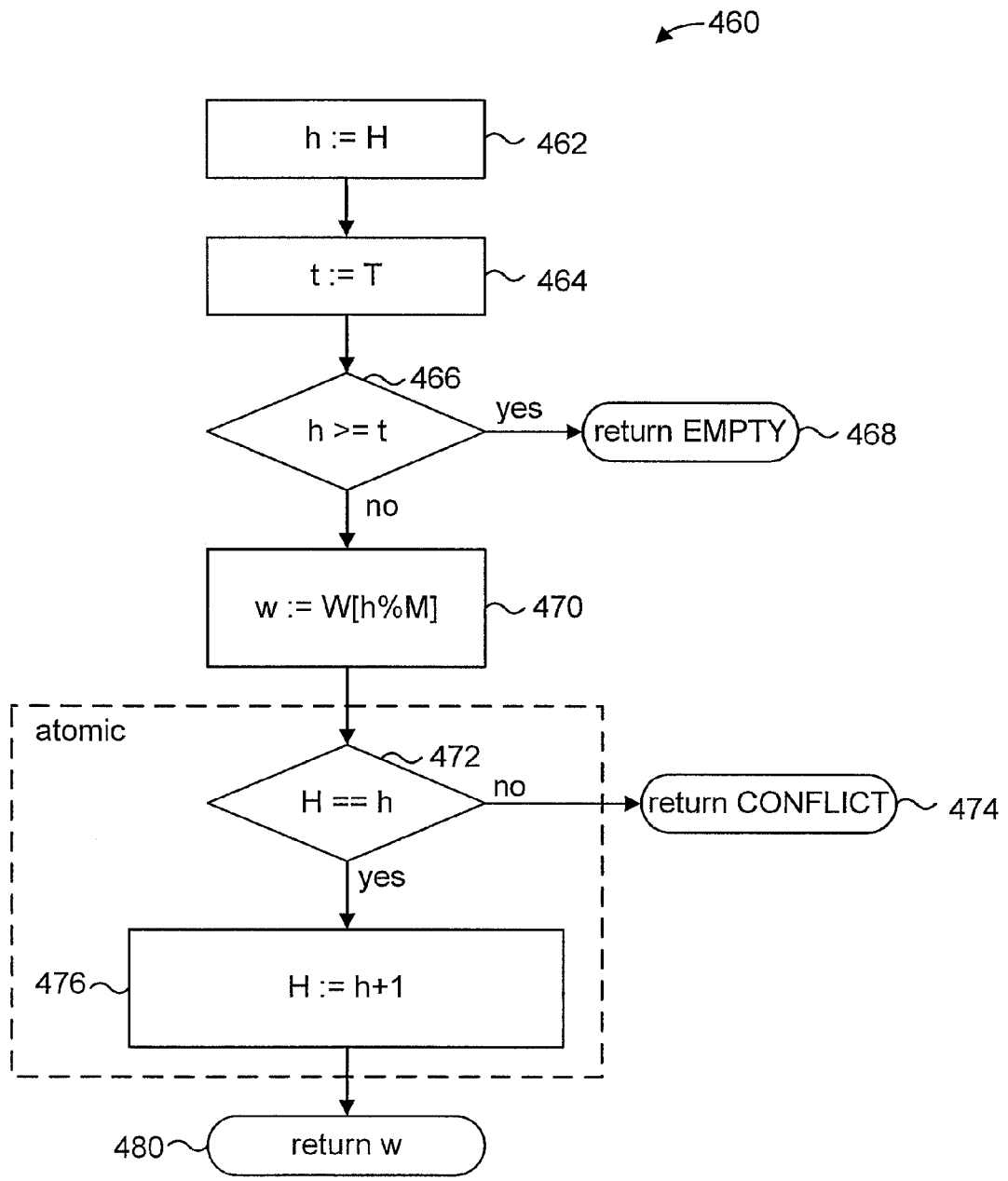

FIGS. 4A, 4B, and 4C respectively show exemplary methods 400, 430, and 460 relating to double-ended extraction on a work queue, in accordance with an embodiment of the present principles. In further detail, the method 400 of FIG. 4A corresponds to a Put(w) operation, the method 430 of FIG. 4B corresponds to a Take( ) operation, and the method 460 of FIG. 4C corresponds to a Steal( ) operation, each corresponding to double-ended extraction on a work queue. The methods 400, 430, and 460 may be applied, for example, to the work queue 300 of FIG. 3.

Initially, the Put(w) operation will be generally described, following by a description of the method 400 of FIG. 4A. Only the owner thread (i.e., owner) of the queue can perform a Put(w) operation on the queue. The owner puts a new work item at the tail end of the work queue. The Put(w) operation takes as a parameter the work item to be added to the queue.

Referring to method 400 of FIG. 4A, at step 404, the owner atomically reads the value from T into local variable t.

At step 408, the owner atomically reads the value from H into local variable h.

At step 412, it is determined if t-h is equal to M.

If so (i.e., if t-h is equal to M), then at step 416, an indicator is provided that the queue is full.

If t-h is not equal to M, then at step 420, the owner writes the item w into the entry of array W with index t % M. This write operation does not have to be atomic.

At step 424, the owner atomically writes the value t+1 to the shared variable T.

At step 428, the Put(w) operation returns a success indicator.

Initially, the Take( ) operation will be generally described, following by a description of the method 230 of FIG. 2B. Only the owner thread (i.e., owner) of the queue can perform a Take( ) operation on the queue. The Take( ) operation returns a work item that was put earlier by the owner thread, or an indictor of an empty queue if the queue is empty. The Take( ) operation extracts a work item from the tail end of the queue, i.e., the most recent item put in the queue by the owner.

Referring to FIG. 4B, at step 432, the value of T is atomically read, and the value of T minus 1 is kept in a local variable t.

At step 434, the owner atomically writes the value of local variable t into the shared variable T.

At step 436, the owner atomically reads the value from H into a local variable h.

At step 438, it is determined whether or not t is smaller than h (i.e., the queue is empty).

If so (i.e., t is smaller than h), then at step 440, the owner writes the value h into T. At step 442, the Take( ) operation returns an empty queue indicator.

If t is not smaller than h, then at step 444, it is determined whether or not t is equal to h.

If so (i.e., t is equal to h), then at step 446, the owner atomically writes the value h+1 into T. At step 448, the owner atomically writes h+1 into H.

If t is not equal to h (and also following step 448), the Take( ) operation returns the item with index t%M in the array W.

With respect to the Steal( ) operation, initially, the Steal( ) operation will be generally described, following by a description of the method 460 of FIG. 4C. A Steal( ) operation is executed by a thread different (hereinafter referred to as "other thread" or "other thread(s)") from the thread owner. Typically, the other thread has an empty work queue, and hence is looking to help other threads with their work. The Steal( ) operation returns a work item that was put in the queue by the queue's owner, an indicator of an empty queue if the queue is empty, or an indicator of conflict. The Steal( ) operation extracts a work item from the head of the queue, i.e., the oldest item in the queue.

Referring to FIG. 4C, at step 462, the Steal( ) operation atomically reads from variable H into local variable h.

At step 464, the other thread(s) atomically reads from variable T into local variable t.

At step 466, it is determined whether or not h is greater than or equal to t.

If so (h is greater than or equal to t), then at step 468, an indicator is provided of an empty queue.

If h is not greater than or equal to t, then at step 470, the other thread(s) reads the entry of array W with index h, i.e., at the head of the queue. This read operation does not have to be atomic.

At step 472, it is determined whether or not the value H is the same as that read in the first step (i.e., step 462). The read-check-write in steps 472 and 476 are complex atomic instructions.

If not (i.e., the value of H is different), then at step 474, an indicator is provided that a conflict exists. In such a case, the other thread may be permitted to decide on the next course of action including, bit not limited to, retrying the operation on this work queue or trying a different work queue.

If the value of H is the same (between steps 462 and 472), then at step 476, the other thread(s) atomically writes the value h+1 to H.

At step 480, the Steal( ) operation returns the extracted item.

In an embodiment, the methods 400, 430, and 460 of FIGS. 4A, 4B, and 4C, respectively, may be represented by the following pseudo code. In the following pseudo code, the operations Put(w) and Take( ) are performed by the owner only.

Figure 5A:
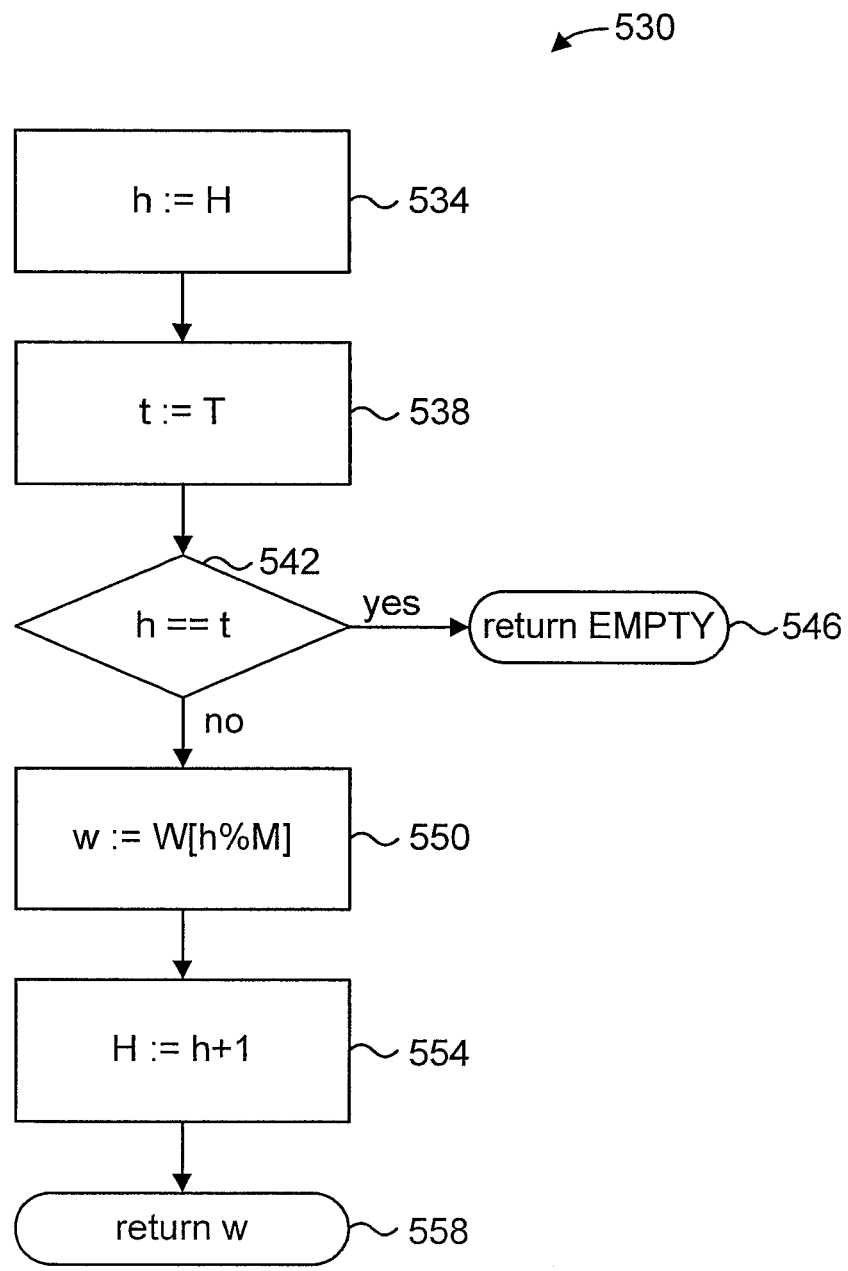
FIGS. 5A and 5B respectively show exemplary methods 530 and 560 relating to first in first out (FIFO) extraction on a work queue, in accordance with an embodiment of the present principles.
Figure 5B:
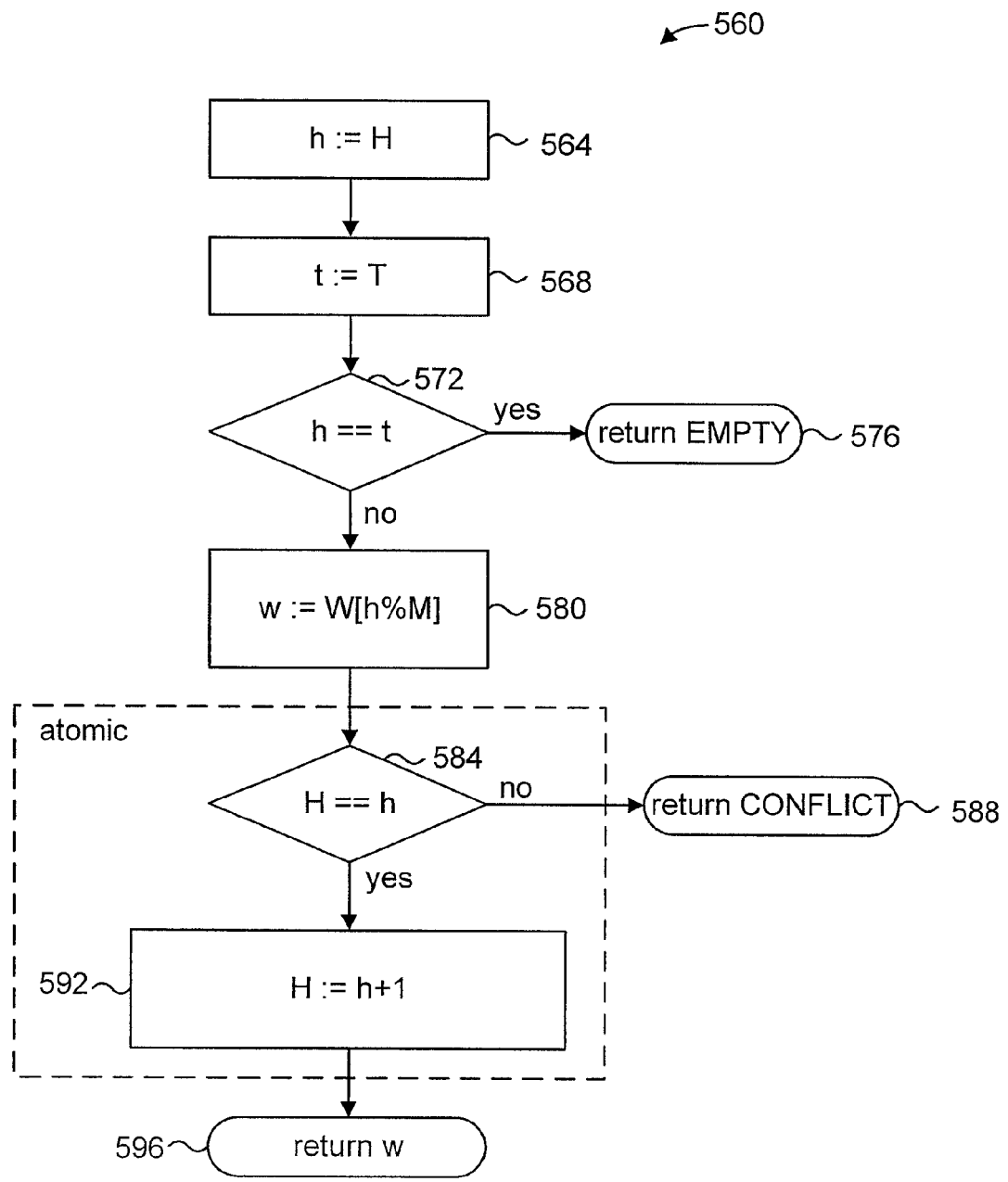

Structures
H: integer//Head
T: integer//Tail
W: array of tasks of size M
Initialization
H:=0
T:=0
Put(w)
1 t:=T
2 h:=H
if (t−h==M) return FULL
3 W[t % M]:=w
4 T:=t+1
return SUCCESS
Take( )
1 t:=T−1
2 T:=t
3 h:=H
4 if (t<h) T:=h; return EMPTY
if (t==h)
5 T:=h+1
6 H:=h+1
7 return W[t % M]
Steal( )
1 h:=H
2 t:=T
if (h>=t) return EMPTY
3 w:=W [h % M]
4 if !CAS(H,h,h+1) return CONFLICT
return w FIGS. 5A and 5B respectively show exemplary methods 530 and 560 relating to first in first out (FIFO) extraction on a work queue, in accordance with an embodiment of the present principles. In further detail, the method 530 of FIG. 5A corresponds to a Take( ) operation and the method 560 of FIG. 5B corresponds to a Steal( ) operation, each corresponding to first in first out (FIFO) extraction on a work queue. The methods 530 and 560 may be applied, for example, to the work queue 300 of FIG. 3. It is to be noted that the Put(w) operation relating to first in first out extraction on a work queue is the same as that described for the Put(w) operation of FIG. 4A (and is, hence, not reproduced again with respect to FIFO extraction for reasons of brevity).

Initially, the Take( ) operation will be generally described, following by a description of the method 530 of FIG. 5A. Only the owner thread (i.e., owner) of the queue can perform a Take( ) operation on the queue. The Take( ) operation returns a work item that was put earlier by the owner thread, or an indictor of an empty queue if the queue is empty. The Take( ) operation extracts a work item from the head end of the queue, i.e., the oldest item put in the queue by the owner.

Referring to FIG. 5A, at step 534, the Take( ) operations atomically reads the value of H into a local variable h.

At step 538, the owner atomically reads the value from T into a local variable t.

At step 542, it is determined whether or not h is equal to t.

If so (i.e., h is equal to t), then at step 546, an indicator is provided that the queue is empty.

If h is not equal to t, then at step 550, the owner reads the entry of array W with index h % M, i.e., the oldest item in the queue. This read operation does not have to be atomic.

At step 554, the owner atomically writes the value h+1 into H.

At step 558, the Take( ) operation returns the extracted item.

With respect to the Steal( ) operation, initially, the Steal( ) operation will be generally described, following by a description of the method 560 of FIG. 5B. A Steal( ) operation is executed by a thread different (hereinafter referred to as "other thread" or "other thread(s)") from the thread owner. Typically, the other thread has an empty work queue, and hence is looking to help other threads with their work. The Steal( ) operation returns a work item that was put in the queue by the queue's owner, an indicator of an empty queue if the queue is empty, or an indicator of conflict. The Steal( ) operation extracts a work item from the head of the queue, i.e., the oldest item in the queue.

Referring to FIG. 5B, at step 564, the Steal( ) operation atomically reads from variable H into local variable h.

At step 568, the other thread(s) atomically reads from the variable T into a local variable t.

At step 572, it is determined whether or not h is equal to t.

If so (i.e., h is equal to t), then at step 576, an indicator is provided of an empty queue.

If h is not equal to t, then at step 580, the other thread(s) reads the entry of array W with index h % M, i.e., at the head of the queue. This read operation does not have to be atomic.

At step 584, it is determined whether or not the value of H is the same as that read in the first step (i.e., step 564).

If not (i.e., the value of H is different), then at step 588, an indicator is provided that a conflict exists. In such a case, the other thread may be permitted to decide on the next course of action including, but not limited to, retrying the operation on this work queue or trying a different work queue.

If the value of H is the same (between steps 564 and 584, then at step 592, the other thread(s) atomically writes the value h+1 into H. It is to be noted that read-check-write in steps 592 and 596 are complex atomic instructions.

At step 596, the Steal( ) operation returns the extracted item.

In an embodiment, the method 530 and 560 of FIGS. 5A and 5B and 5C, respectively, may be represented by the following pseudo code. In the following pseudo code, the operations Put(w) and Take( ) are performed by the owner only. It is to be that noted pseudo code for a Put(w) operation corresponding to first out (FIFO) extraction on a work queue may be represented by the pseudo code provided above with respect to the method 400 of FIG. 4A.

Figure 6:
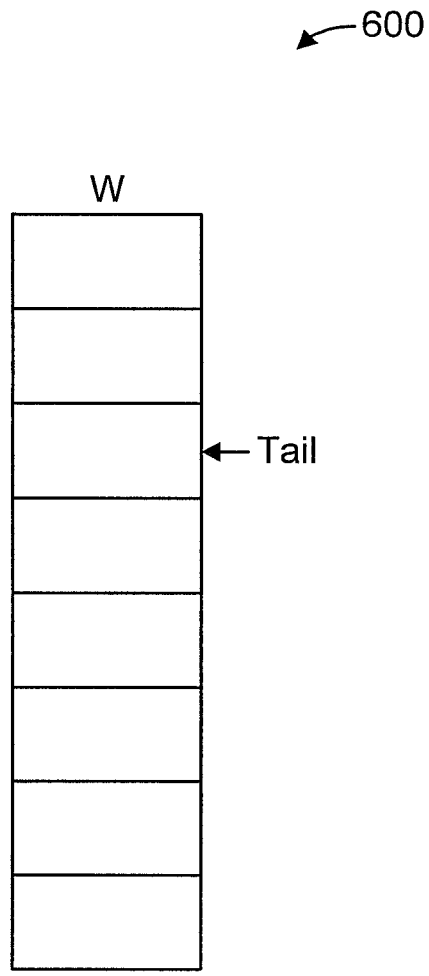
FIG. 6 shows an exemplary work queue 600 with two tasks, to which the present principles may be applied, in accordance with an embodiment of the present principles.

Structures
H: integer//Head
T: integer//Tail
W: array of tasks of size M
Initialization
H:=0
T:=0
Take( )
1 h:=H
2 t:=T
if (h==t) return EMPTY
3 w:=W[h % M]
4 H:=h+1
return w
Steal( )
1 h:=H
2 t:=T
if (h==t) return EMPTY
3 w:=[h % M]
4 if !CAS(H,h,h+1) return CONFLICT
return w FIG. 6 shows an exemplary work queue 600 with two tasks, to which the present principles may be applied, in accordance with an embodiment of the present principles.

The reference character W represents a circular array of work items of size M. With respect to array W, the queue owner puts work items into the array, and the owner and other threads may take work items from the array. During normal queue operations (put, take, and steal), the size of the array is treated as constant. However, the owner of the queue can resize the array in a straightforward manner as described herein.

The reference character T denotes a single variable that can be accessed atomically. T includes two integer components corresponding to the tail of the work queue 600 and tag for the work queue 600, respectively. The tail of the work queue corresponds to the index of the tail end of the work queue. The tag for the work queue is a number that is incremented on every extraction. Preferably, the size of the tag is large enough (e.g., 40 bits) such that it is impossible for the tag to make a complete wrap-around during a single operation on the queue by a thread. The initial value of T is all zeros.

Figure 7A:
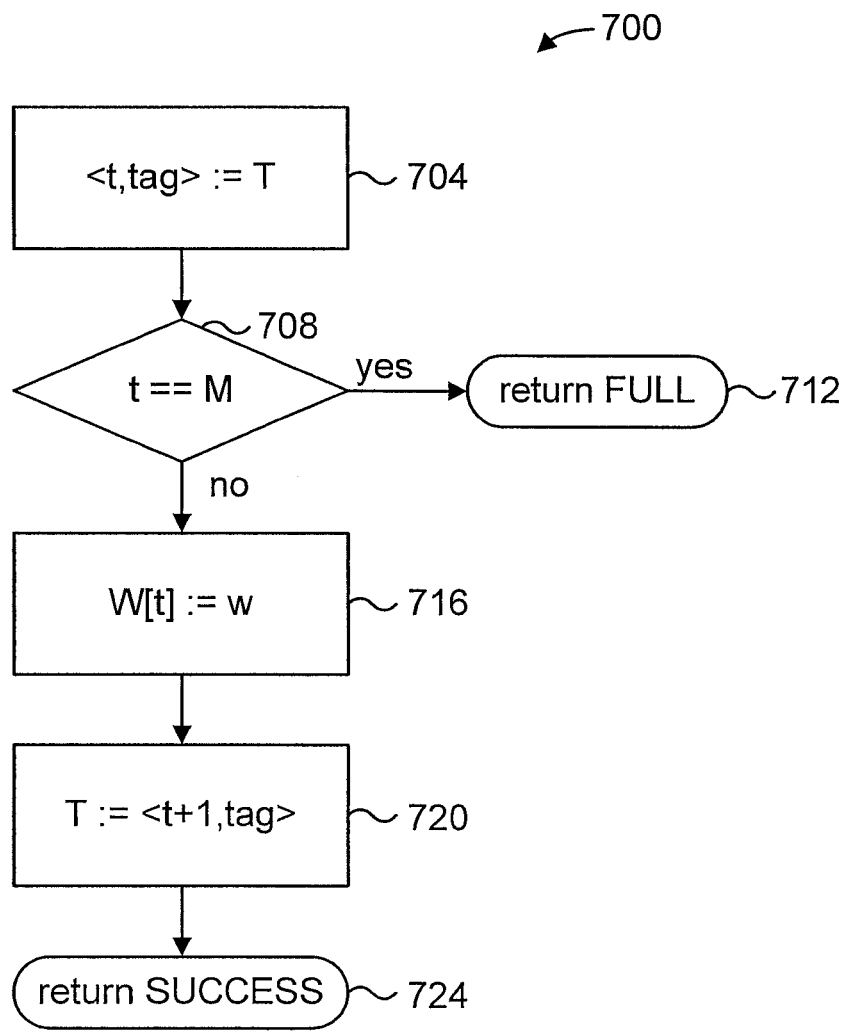
FIGS. 7A, 7B, and 7C respectively show exemplary methods 700, 730, and 760 relating to last in first out (LIFO) extraction on a work queue, in accordance with an embodiment of the present principles.
Figure 7B:
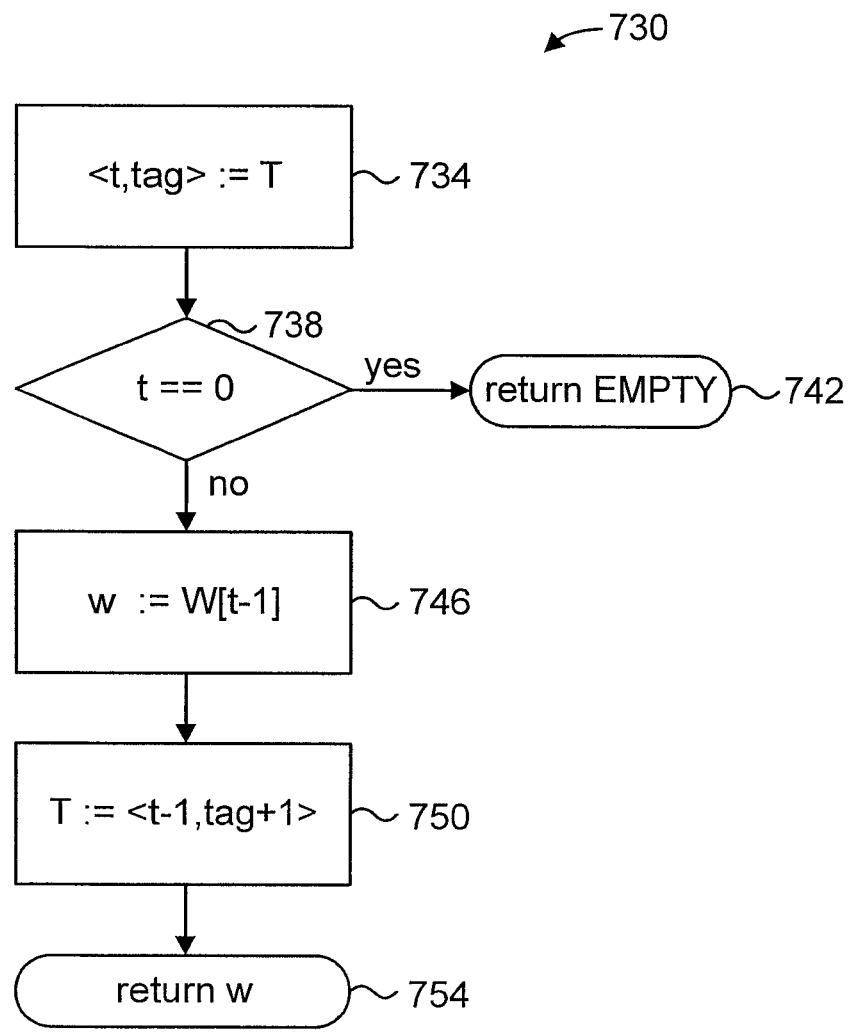
Figure 7C:
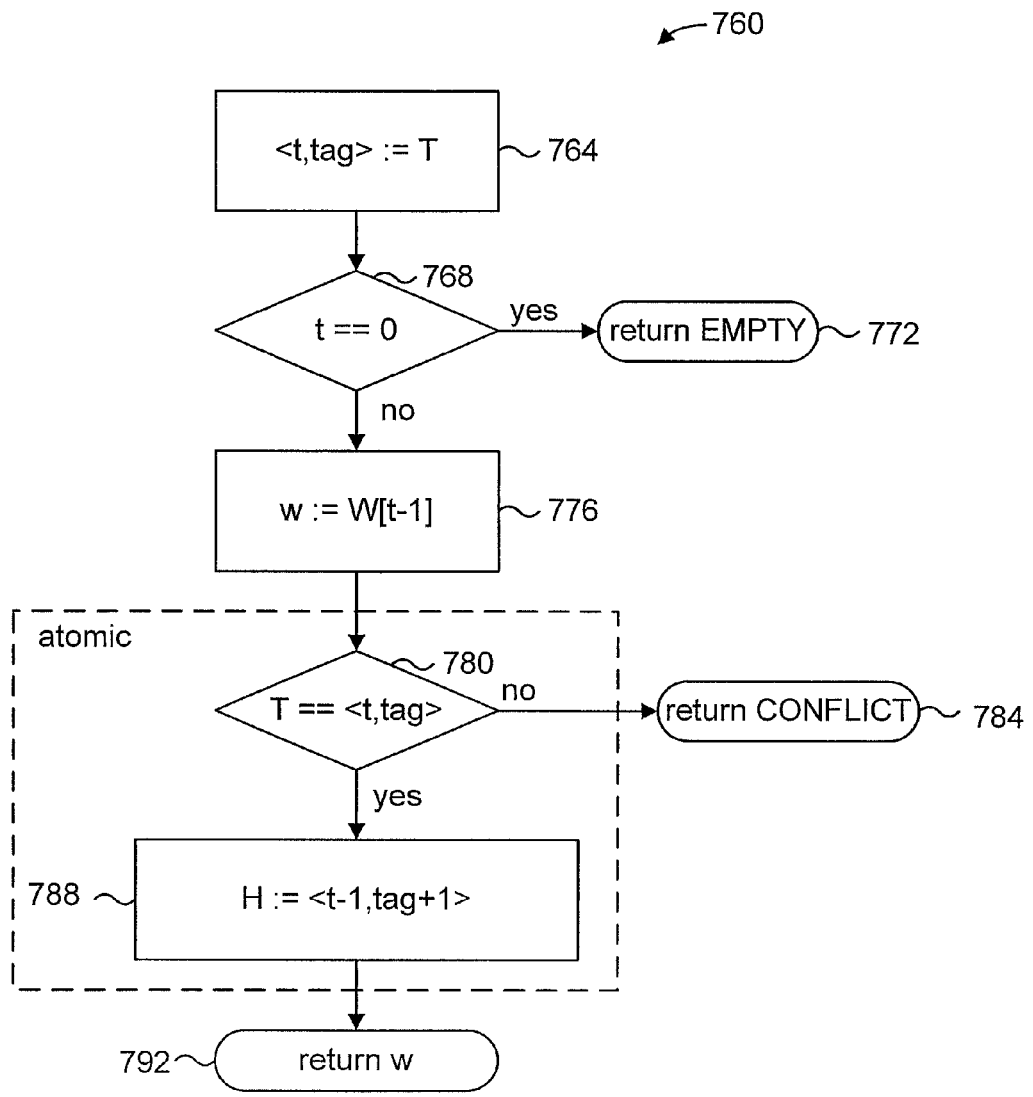

FIGS. 7A, 7B, and 7C respectively show exemplary methods 700, 730, and 760 relating to last in first out (LIFO) extraction on a work queue, in accordance with an embodiment of the present principles. In further detail, the method 700 of FIG. 7A corresponds to a Put(w) operation, the method 730 of FIG. 7B corresponds to a Take( ) operation, and the method 760 of FIG. 7C corresponds to a Steal( ) operation, each corresponding to last in first out (LIFO) extraction on a work queue. The methods 700, 730, and 760 may be applied, for example, to the work queue 600 of FIG. 6.

Initially, the Put(w) operation will be generally described, following by a description of the method 700 of FIG. 7A. Only the owner thread (i.e., owner) of the queue can perform a Put(w) operation on the queue. The owner puts a new work item at the tail end of the work queue. The Put(w) operation takes as a parameter the work item to be added to the queue.

Referring to method 700 of FIG. 7A, at step 704, the Put(w) operation atomically reads two integer values (corresponding to tail and tag, respectively) are atomically read from variable T into local variables t and tag.

At step 708, it is determined whether or not t is equal to the capacity of the queue (i.e., the size M of the array W).

If so (i.e., the value of t is equal to M), then at step 712, an indicator is provided that the queue is full. In such a case, the owner of the queue may be permitted to decide the next course of action including, but not limited to, extending the size of the array W.

If the value of t is not equal to M (e.g., it is smaller than M), then at step 716, the owner writes the item w into the entry of array W with index t. This write operation does not have to be atomic.

At step 720, the queue owner atomically writes to the variable T the two values t+1 and tag.

At step 724, the Put(w) operation returns a success indicator.

With respect to the Take( ) operation, initially, the Take( ) operation will be generally described, following by a description of the method 730 of FIG. 7B. Only the owner thread (i.e., owner) of the queue can perform a Take( ) operation on the queue. The Take( ) operation returns a work item that was put earlier by the owner thread, or an indictor of an empty queue if the queue is empty. The Take( ) operation extracts a work item from the tail end of the queue, i.e., the most recent item put in the queue by the owner.

Referring to FIG. 7B, at step 734, the Take( ) operations atomically reads two integer values (corresponding to tail and tag, respectively) from variable T into local variables t and tag.

At step 738, it is determined whether or not t is equal to zero.

If so (i.e., the value of t is equal to zero), then at step 742, an indicator is provided that the queue is empty.

If the value of t is not equal to zero, then at step 746, the owner reads the entry of array W with index t−1, i.e., the most recently added item. This read operation does not have to be atomic.

At step 750, the owner atomically writes to the variable T the two values t−1 and tag+1.

At step 754, the Take( ) operation returns the extracted item.

With respect to the Steal( ) operation, initially, the Steal( ) operation will be generally described, following by a description of the method 760 of FIG. 7C. A Steal( ) operation is executed by a thread different (hereinafter referred to as "other thread" or "other thread(s)") from the thread owner. Typically, the other thread has an empty work queue, and hence is looking to help other threads with their work. The Steal( ) operation returns a work item that was put in the queue by the queue's owner, an indicator of an empty queue if the queue is empty, or an indicator of conflict. The Steal( ) operation extracts a work item from the tail of the queue, i.e., the most recent item in the queue.

Referring to FIG. 7C, at step 764, the Steal( ) operation atomically reads two integer values (corresponding to tail and tag, respectively) from variable T into local variables t and tag.

At step 768, it is determined whether or not t is equal to zero.

If so (i.e., if t is equal to zero), then at step 772, an indicator is provided that the queue is empty.

If the value of t is not equal to zero, then at step 776, the other thread(s) read the entry of array W with index t−1. This read operation does not have to be atomic.

At step 780, it is determined whether or not the value of t is the same as that read in the first step (i.e., step 764).

If not (i.e., the value of t is different), then at step 784, an indicator is provided that a conflict exists. In such a case, the other thread may be permitted to decide on the next course of action including, but not limited to, retrying the operation on this work queue or trying a different work queue.

If the value of t is the same (between steps 764 and 780), then at step 788, the other thread atomically writes to the variable H the two values t−1 and tag+1. It is to be noted that the read-check-write steps of 780 and 788 are complex atomic instructions.

At step 792, the Steal( ) operation returns the extracted item.

In an embodiment, the methods 700, 730, and 760 of FIGS. 7A, 7B, and 7C, respectively, may be represented by the following pseudo code. In the following pseudo code, the operations Put(w) and Take( ) are performed by the owner only.

Structures
T: <integer,integer>//<Tail,Tag>
W: array of tasks of size M
Initialization
T:=<0, 0>
Put (w)
1 t, tag:=T
if (t==M) return FULL
2 W[t]:=w
3 T:=<t+1,tag>
return SUCCESS
Take( )
1 <t,tag>:=T
if (t==0) return EMPTY
2 w:=W [t−1]
3 T:=<t−1,tag+1>
return w
Steal( )
1 <t,tag>:=T
if (t==0) return EMPTY
2 w:=W[t−1]
3 if !CAS(T,<t,tag>,<t−1,tag+1>) return CONFLICT
return w One or more extensions of the present principles, in accordance with one or more embodiments thereof will now be described. For example, in an embodiment, any of the queues described herein can be grown unbounded. The owner can simply replace the circular array with another circular array with a different size after copying the items in the old array to the corresponding locations (modulo array sizes) in the new array. In systems with automatic garbage collection, the old array is reclaimed automatically. In systems with explicit memory de-allocation, using any of the known safe memory reclamation methods, such as hazard pointers, can be used to reclaim the old array.

Having described preferred embodiments of methods (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
permitting a single owner thread of a single owner, multi-consumer, work queue to access the work queue using atomic instructions limited to only a single access and using non-atomic operations;
restricting the single owner thread from accessing the work queue using atomic instructions involving more than one access; and
synchronizing amongst other threads with respect to their respective accesses to the work queue,
wherein the atomic instructions limited to only a single access consist of only one of a single read or a single write.

2. The method of claim 1, further comprising prohibiting the single owner thread from re-writing, to the work queue, shared, non-initialization-related variables that have already been written by the other threads to the work queue.

3. The method of claim 1, further comprising prohibiting the other threads from re-writing, to the work queue, shared variables that have already been written by the single owner thread to the work queue.

4. The method of claim 1, wherein operations performed by the single owner thread comprise an insertion operation that involves atomically reading at least two integer values from a single shared variable having at least two integer components respectively relating to a head of the work queue and a number of items in the work queue into a first and a second local variable respectively, writing an item into a work queue entry having an index based on a sum of the first and the second local variables, and atomically writing at least two values to the single shared variable, the at least two values respectively comprising the first local variable and a sum of the second local variable plus one.

5. The method of claim 1, wherein operations performed by the single owner thread comprise an extraction operation that involves atomically reading at least two integer values from a single shared variable having at least two integer components respectively relating to a head of the work queue and a number of items in the work queue into a first and a second local variable respectively, reading a work queue entry having an index based on a sum of the first local variable and the second local variable minus one, and atomically writing at least two values to the single shared variable, and returning the work queue entry, the at least two values respectively comprising the first local variable and the second local variable minus one.

6. The method of claim 1, wherein an operation performed by at least one of the other threads comprises atomically reading at least two integer values from a single shared variable having at least two integer components respectively relating to a head of the work queue and a number of items in the work queue into a first and a second local variable respectively, reading a work queue entry having an index equal to the first local variable, checking that the value of the single shared variable is currently equal to an initially read value there for during the operation, writing a sum of the first local variable plus one and a difference of the second local variable minus one to the single shared variable and providing an indication of success and returning the work queue entry when the value of the single shared variable is currently equal to the initially read value there for, wherein the checking and the writing are performed together atomically.

7. The method of claim 1, wherein operations performed by the single owner thread comprise an insertion operation that involves atomically reading an integer value from a single shared variable having a single integer component relating to a tail of the work queue into a local variable, writing an item into a work queue entry having an index based on the local variable, and atomically writing a sum of the local variable plus one to the single shared variable.

8. The method of claim 1, wherein operations performed by the single owner thread comprise an extraction operation that involves atomically reading an integer value from a single shared variable having a single integer component relating to a tail of the work queue and maintaining the integer value minus one in a local variable, atomically writing the local variable into the single shared variable, atomically reading another integer value from another single shared variable having another single integer component relating to a head of the work queue into another local variable, checking whether the local variable is less than the other local variable, writing the other local variable to the single shared variable when the local variable is less than the other local variable, and atomically writing a sum of the other local variable plus one into the single shared variable and the other single shared variable and returning a work queue item having an index equal to the local variable when the local variable is not less than the other local variable.

9. The method of claim 1, wherein an operation performed by at least one of the other threads comprises atomically reading at least one integer value from a single shared variable having at least one integer component relating to a head of the work queue into a local variable, reading a work queue entry having an index equal to the local variable, checking that the value of the single shared variable is currently equal to an initially read value there for during the operation, writing a sum of the local variable plus one to the single shared variable and providing an indication of success and returning the work queue entry when the value of the single shared variable is currently equal to the initially read value there for, wherein the checking and the writing are performed together atomically.

10. The method of claim 1, wherein the work queue is configured as a circular array.

11. A non-transitory program storage device readable by machine, tangibly embodying a program of instructions executable by the machine to perform method steps for queue access management, the method steps comprising:
   permitting a single owner thread of a single owner, multi-consumer, work queue to access the work queue using atomic instructions limited to only a single access and using non-atomic operations;
   restricting the single owner thread from accessing the work queue using atomic instructions involving more than one access; and
   synchronizing amongst other threads with respect to their respective accesses to the work queue,
   wherein the atomic instructions limited to only a single access consist of only one of a single read or a single write.

12. The program storage device of claim 11, further comprising prohibiting the single owner thread from re-writing, to the work queue, shared, non-initialization-related variables that have already been written by the other threads to the work queue.

13. The program storage device of claim 11, further comprising prohibiting the other threads from re-writing, to the work queue, shared variables that have already been written by the single owner thread to the work queue.

14. The program storage device of claim 11, wherein operations performed by the single owner thread comprise an insertion operation that involves atomically reading at least two integer values from a single shared variable having at least two integer components respectively relating to a head of the work queue and a number of items in the work queue into a first and a second local variable respectively, writing an item into a work queue entry having an index based on a sum of the first and the second local variables, and atomically writing at least two values to the single shared variable, the at least two values respectively comprising the first local variable and a sum of the second local variable plus one.

15. The program storage device of claim 11, wherein operations performed by the single owner thread comprise an extraction operation that involves atomically reading at least two integer values from a single shared variable having at least two integer components respectively relating to a head of the work queue and a number of items in the work queue into a first and a second local variable respectively, reading a work queue entry having an index based on a sum of the first local variable and the second local variable minus one, and atomically writing at least two values to the single shared variable, and returning the work queue entry, the at least two values respectively comprising the first local variable and the second local variable minus one.

16. The program storage device of claim 11, wherein an operation performed by at least one of the other threads comprises atomically reading at least two integer values from a single shared variable having at least two integer components respectively relating to a head of the work queue and a number of items in the work queue into a first and a second local variable respectively, reading a work queue entry having an index equal to the first local variable, checking that the value of the single shared variable is currently equal to an initially read value there for during the operation, writing a sum of the first local variable plus one and a difference of the second local variable minus one to the single shared variable and providing an indication of success and returning the work queue entry when the value of the single shared variable is currently equal to the initially read value there for, wherein the checking and the writing are performed together atomically.

17. The program storage device of claim 11, wherein operations performed by the single owner thread comprise an insertion operation that involves atomically reading an integer value from a single shared variable having a single integer component relating to a tail of the work queue into a local variable, writing an item into a work queue entry having an index based on the local variable, and atomically writing a sum of the local variable plus one to the single shared variable.

18. The program storage device of claim 11, wherein operations performed by the single owner thread comprise an extraction operation that involves atomically reading an integer value from a single shared variable having a single integer component relating to a tail of the work queue and maintaining the integer value minus one in a local variable, atomically writing the local variable into the single shared variable, atomically reading another integer value from another single shared variable having another single integer component relating to a head of the work queue into another local variable, checking whether the local variable is less than the other local variable, writing the other local variable to the single shared variable when the local variable is less than the other local variable, and atomically writing a sum of the other local variable plus one into the single shared variable and the other single shared variable and returning a work queue item having an index equal to the local variable when the local variable is not less than the other local variable.

19. The program storage device of claim 11, wherein an operation performed by at least one of the other threads comprises atomically reading at least one integer value from a single shared variable having at least one integer component relating to a head of the work queue into a local variable, reading a work queue entry having an index equal to the local variable, checking that the value of the single shared variable is currently equal to an initially read value there for during the operation, writing a sum of the local variable plus one to the single shared variable and providing an indication of success and returning the work queue entry when the value of the single shared variable is currently equal to the initially read value there for, wherein the checking and the writing are performed together atomically.

20. The program storage device of claim 11, wherein the work queue is configured as a circular array.

* * * * *